United States Patent
Argenti et al.

(10) Patent No.: US 10,911,404 B1
(45) Date of Patent: Feb. 2, 2021

(54) ATTRIBUTE BASED AUTHORIZATION

(71) Applicant: Amazon Technologies, Inc., Seattle, WA (US)

(72) Inventors: Marco Argenti, Mercer Island, WA (US); Khawaja Salman Shams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/834,354

(22) Filed: Aug. 24, 2015

(51) Int. Cl.
*H04L 29/06* (2006.01)
*H04W 12/06* (2009.01)

(52) U.S. Cl.
CPC ......... *H04L 63/0227* (2013.01); *H04W 12/06* (2013.01)

(58) Field of Classification Search
CPC .................... H04L 63/0227; H04W 12/06
See application file for complete search history.

(56) References Cited

U.S. PATENT DOCUMENTS

| | | | |
|---|---|---|---|
| 6,249,836 B1 | 6/2001 | Downs et al. | |
| 6,665,565 B1 | 12/2003 | Stomberg et al. | |
| 7,805,706 B1 | 9/2010 | Ly et al. | |
| 8,391,226 B2 * | 3/2013 | Rune | H04W 60/005 370/329 |
| 8,621,069 B1 | 12/2013 | Tompkins | |
| 8,788,855 B2 | 7/2014 | Cong et al. | |
| 9,256,467 B1 | 2/2016 | Singh et al. | |
| 9,313,172 B1 * | 4/2016 | Brandwine | H04L 63/0272 |
| 9,449,346 B1 * | 9/2016 | Hockey | G06Q 40/02 |
| 9,461,876 B2 | 10/2016 | Van Dusen et al. | |
| 9,753,669 B2 | 9/2017 | Ben-Shaul et al. | |
| 10,645,582 B2 * | 5/2020 | Wohlert | H04W 12/0608 |
| 2003/0032417 A1 | 2/2003 | Minear et al. | |
| 2004/0040025 A1 | 2/2004 | Lehtinen | |
| 2004/0054997 A1 | 3/2004 | Katragadda et al. | |
| 2006/0136928 A1 | 6/2006 | Crawford et al. | |
| 2006/0168575 A1 | 7/2006 | Bhatt et al. | |
| 2006/0168581 A1 | 7/2006 | Goger et al. | |
| 2007/0118657 A1 | 5/2007 | Kreitzer et al. | |
| 2007/0245331 A1 | 10/2007 | Daynes et al. | |
| 2010/0131792 A1 | 5/2010 | Herrod | |
| 2010/0153941 A1 | 6/2010 | Borissov et al. | |

(Continued)

FOREIGN PATENT DOCUMENTS

WO 2014047073 A1 3/2014

OTHER PUBLICATIONS

International Search Report and Written Opinion dated Feb. 16, 2016, issued in International Patent Application No. PCT/US2015/050513, filed Sep. 16, 2015, 20 pages.

(Continued)

*Primary Examiner* — Jahangir Kabir
(74) *Attorney, Agent, or Firm* — Davis Wright Tremaine LLP

(57) ABSTRACT

A service provider may provide a plurality of companion instances associated with a mobile device in order to facilitate operation of the mobile device. The companion instances and the mobile device may be configured to execute various components of one or more application. Furthermore, an identity firewall may be provided to authorize and route network traffic to the plurality of companion instances based at least in part one or more attributes of the network traffic.

21 Claims, 9 Drawing Sheets

(56) References Cited

U.S. PATENT DOCUMENTS

| | | |
|---|---|---|
| 2010/0318999 A1 | 12/2010 | Zhao |
| 2011/0022633 A1 | 1/2011 | Bernosky et al. |
| 2012/0297311 A1 | 11/2012 | Duggal |
| 2013/0029641 A1* | 1/2013 | Hickie .................. G06F 21/604 455/411 |
| 2013/0073600 A1 | 3/2013 | Jenkins |
| 2013/0109371 A1 | 5/2013 | Brogan et al. |
| 2013/0191527 A1 | 7/2013 | Ashok et al. |
| 2013/0297964 A1 | 11/2013 | Hegdal et al. |
| 2014/0007214 A1* | 1/2014 | Qureshi .............. H04L 63/0428 726/12 |
| 2014/0149986 A1 | 5/2014 | S M et al. |
| 2014/0153481 A1* | 6/2014 | Draznin ................ H04W 40/02 370/328 |
| 2014/0173058 A1 | 6/2014 | Twitchell, Jr. |
| 2014/0189388 A1 | 7/2014 | Lynar et al. |
| 2014/0207680 A1 | 7/2014 | Rephlo |
| 2014/0304356 A1 | 10/2014 | Allen, Sr. et al. |
| 2014/0310792 A1* | 10/2014 | Hyland ............... H04L 63/0861 726/8 |
| 2014/0344446 A1* | 11/2014 | Rjeili ...................... H04L 43/04 709/224 |
| 2014/0351917 A1* | 11/2014 | Chickering ............. H04L 63/02 726/11 |
| 2015/0058473 A1 | 2/2015 | Grande |
| 2015/0256423 A1 | 9/2015 | Stearns |
| 2015/0331635 A1 | 11/2015 | Ben-Shaul et al. |
| 2015/0350362 A1 | 12/2015 | Pollack et al. |
| 2016/0034295 A1 | 2/2016 | Cochran |
| 2016/0048399 A1 | 2/2016 | Shaw |
| 2016/0062623 A1 | 3/2016 | Howard et al. |
| 2016/0092248 A1 | 3/2016 | Shani et al. |
| 2016/0216991 A1 | 7/2016 | Ansari et al. |
| 2017/0180346 A1 | 6/2017 | Suarez et al. |
| 2017/0235848 A1 | 8/2017 | Van Dusen et al. |
| 2017/0262697 A1 | 9/2017 | Kaps et al. |

OTHER PUBLICATIONS

U.S. Appl. No. 14/488,195, filed Sep. 16, 2014.
U.S. Appl. No. 14/754,613, filed Sep. 29, 2015.
U.S. Appl. No. 14/574,604, filed Sep. 29, 2015.
U.S. Appl. No. 14/834,364, filed Aug. 24, 2015.
He et al., "Elastic Application Container: A Lightweight Approach for Cloud Resource Provisioning," 26th IEEE International Conference on Advanced Information Networking and Applications, Mar. 26, 2012, pp. 15-22.
International Search Report and Written dated Feb. 4, 2016, International Patent Application No. PCT/US2015/059983, 12 pages.
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.
Soltesz et al., "Container-based operating system virtualization: a scalable, high-performance alternative to hypervisors," ACM SIGOPS Operating Systems Review 41(3):275-287, Mar. 2007.
Trusted Computing Group, "TPM Main, Part 1 Design Principles," Specification Version 1.2, Level 2 Revision 103, Jul. 9, 2007, 182 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance evaluation of container-based virtualization for high performance computing environments," Parallel, Distributed and Network-BasedProcessing (PDP), 2013 21st Euromicro International Conference, Feb. 2013, pp. 233-240.
Zhao et al., "Experimental study of virtual machine migration in support of reservation of cluster resources," Proceedings of the 2nd international workshop on Virtualization technology in distributed computing, Nov. 2007, pp. 1-8.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Thiele et al., "Embedded Software in Network Processors—Models and Algorithms," Lecture Notes in Computer Science 2211:416-34, Oct. 8, 2001.

* cited by examiner

ATTRIBUTE BASED AUTHORIZATION

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs. Additionally, mobile devices are quickly outgrowing other form factors and the development of mobile applications is growing and becoming more ambitious.

BRIEF DESCRIPTION OF THE DRAWINGS

Various embodiments in accordance with the present disclosure will be described with reference to the drawings, in which.

DETAILED DESCRIPTION

Figure 1:
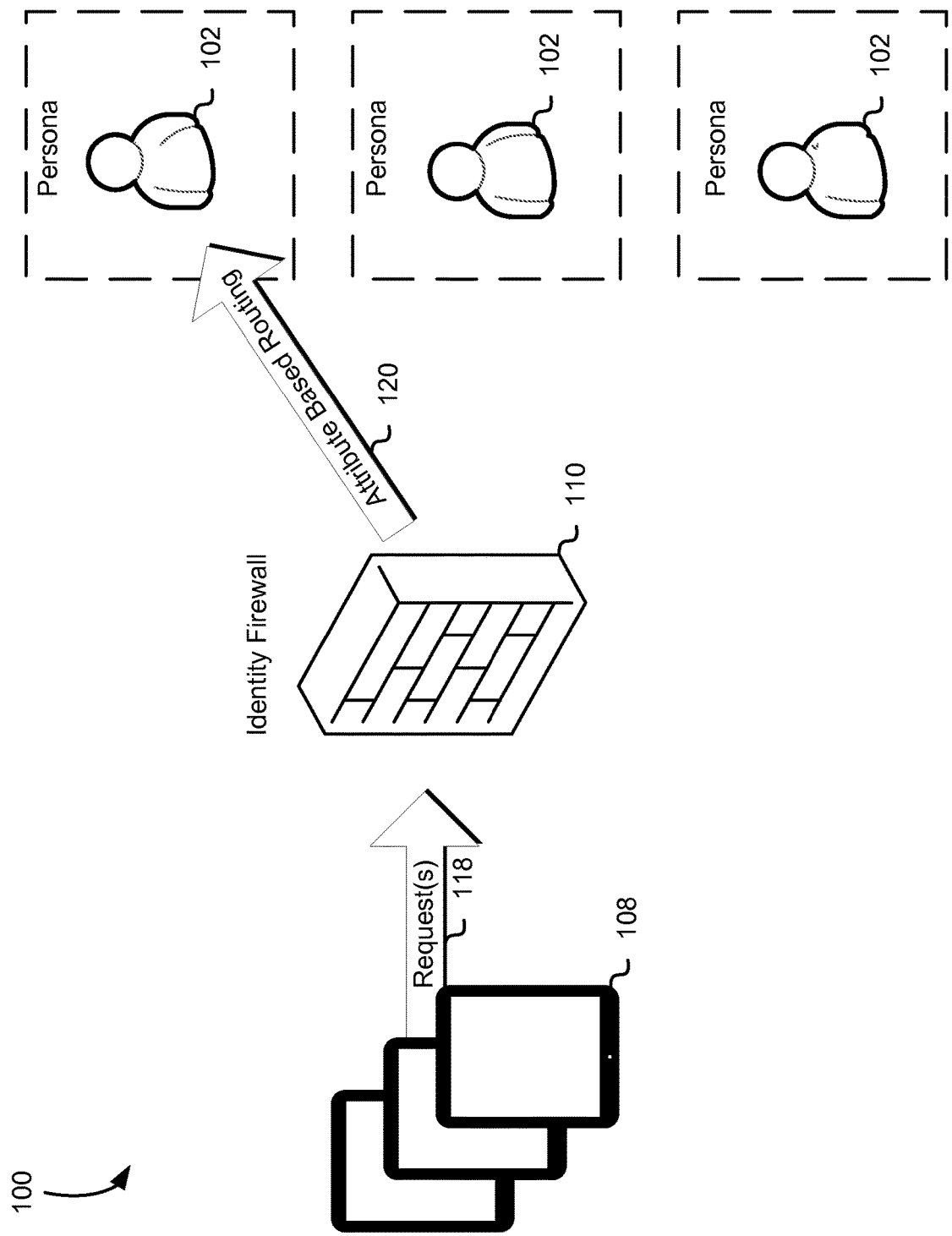
FIG. 1 is a diagram illustrating an environment including an identity firewall configured to perform attribute-based authorization and routing in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for mobile devices and applications executed by mobile devices. A mobile device may be associated with a virtual machine instance referred to herein as a companion instance. The companion instance may be used to consolidate traffic emanating from the associated mobile device and received by the associated mobile device. For example, the companion instance may receive notifications on behalf of the mobile device and push the notifications to the mobile device when able to do so. Additionally, the mobile device may be associated with a container instance. For example, a computing resource service provider may create clusters of software container instances for running software containers for customers (e.g., supporting customers' mobile devices) of a computing resource service provider. The software containers may execute various tasks on behalf of customers' mobile devices. The software container instances may be virtual machine instances configured to support containerization, and the software containers may be registered or deregistered from the cluster as needed to fit the needs of the customer's mobile devices.

Furthermore, at least some of the operations performed by the companion instance or container instances may include dynamically determining authorization and authentication for resources associated with the customer and/or the customer's mobile device based at least in part on one or more attributes of a received request or requestor associated with the received request. The customer's mobile device may also be associated with a set of companion instances where each companion instance of the set of companion instances or subset of companion instances of the set of companion instances may represent a persona or identity of the customer. For example, a request for business information may be directed to the virtual machine associated with the customer's business persona. In another example, the personas may be associated with different types of data, such as a persona for the customer's music and another persona for the customer's photos.

The computing resource service provider may associate an identity firewall with the customer and/or the customer's mobile device. The identity firewall, described in greater detail below, may be configured to determine authorization, authentication, and routing as well as perform other operations on behalf of the customer. For example, the identity firewall may be configured to automatically publish and subscribe to various information streams on behalf of the customer. If a particular customer is capturing images of a marathon using the particular customer's mobile device or other device associated with the identify firewall, the identity firewall may be configured to publish the photo to other customers at the marathon, for example, based on Global Positioning System (GPS) coordinates of the other customers' mobile devices. The identity firewall may provide customers with a single location to define policies for all of the customers' data and/or resources. For example, the customer may provide the identity firewall with a policy and/or rule governing access to the customer's photo. The policy may indicate attributes of a request required to access particular data objects. For example, the customer may limit access to photos taken at the customer's work place to other employees that work at the same workplace.

FIG. 1 illustrates an example environment 100 where an identity firewall 110 may dynamically determine authorization and authentication for resources associated with the customer and/or the customer's mobile device 108 based at least in part on one or more attributes 120 of received requests 118. Additionally, identity firewall 110 may route request 118 and other network traffic to various personas 102. The requests 118 and network traffic may be routed based at least in part on the one or more attributes or based at least in part on performance and/or load characteristics of the various personas 102. For example, a particular persona may be configured to process requests for the set of coworkers of a particular customer, the identity firewall 110 may determine a particular request is associated a coworker of the particular customer and direct the request to the particular persona associated with coworkers. In another example, the identity firewall 110 may be configured to balance requests between the personas 102 such that no one persona becomes overloaded. The identity firewall 110 may also direct request 118 based at least in part on a region or geographic location of the request.

The identity firewall 110 may be a hardware, software, or combination thereof configured to perform the authorization, authentication, and routing operations described in the present disclosure. For example, the identity firewall 110 may be a virtual machine instance or container instance, as described in greater detail below, configured to execute software on behalf of the customer and/or customer's mobile device. The executed software may implement an attribute based policy set configured control access to customer data and customer resources maintained by a computing resource service provider. In various embodiments, the identity firewall 110 is configured as a request interface, and the request interface receives request 118 and determines an appropriate persona 102 to direct the request to. For example, the identity firewall may receive a request for a video associated with the customer and may direct the request to the persona associated with the customer's videos.

The personas 102 may be virtual computer system instances and/or container instance supported by computing resources of the computing resource service provider. The personas 102 may be implemented as companion instance instances described in greater detail below in connection with FIG. 6, may be implemented as container instances described in greater detail below in connection with FIG. 7, or combination of companion instances instance and container instances. The personas 102 may include or have access to various other computing resources. For example, the personas 102 may have attached logical volumes configured to store data on behalf of the customer. In another example, the personas 102 may execute various application, such as a database application, on behalf of the customer.

The mobile devices 108 may be any suitable computer system, mobile phone, smartphone, tablet, portable computer or combination thereof capable of communicating with the identity firewall 110. The mobile devices 108 may include the customer's mobile device. The request 118, transmitted by the mobile devices 108, may include various attributes of the request, the mobile device 108, or requestor associated with the mobile device, or other attribute suitable for authorization, authentication, and routing of the requests 118. For example, the attributes may include interaction with the mobile devices 108, such as what applications were executed today by the mobile devices 108, when was the last time the mobile devices 108 were used to message a particular customer, GPS coordinates and other data collected by the mobile devices 108, a signature generated by the mobile devices 108, and other information obtainable by the mobile devices 108. Additionally, the attributes may include information provided by a third party or other device. For example, a base station communicating the request 118 on behalf of the mobile device may inject a signed certificate indicating that a particular request was transmitted by the mobile device. In another example, an authorization server computer system operated by a service provider may provide an OAuth access token to be included in the requests 118.

Figure 2:
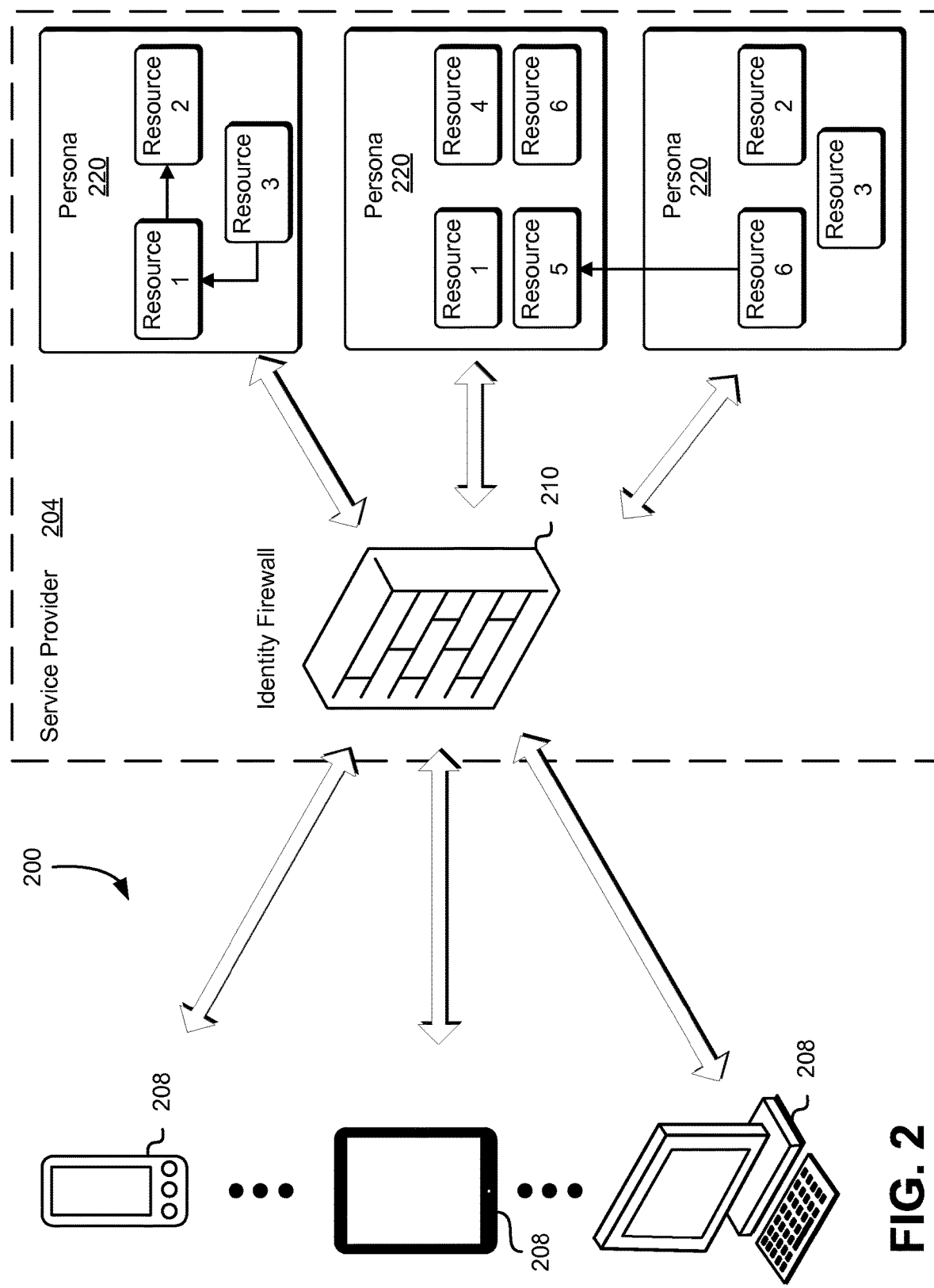
FIG. 2 is a diagram illustrating an environment including an identity firewall configured to perform attribute-based authorization and routing in accordance with at least one embodiment.

FIG. 2 illustrates an example environment 200 where one or more mobile devices 208, as well as the associated code running thereon, may be associated with a persona 220. An identity firewall 210 may be configured to control incoming and outgoing traffic associated with the persona 220. The persona 220 may execute applications and perform various operations on behalf of the mobile devices 208. The persona may be any computer system or virtual computer system configured to execute at least a portion of an application corresponding to an application executed by the mobile device 208. The mobile device 208 may be any suitable computer system, mobile phone, smartphone, tablet, portable computer or combination thereof capable of communicating with a persona 220 through the identity firewall 210 implemented by a service provider 204.

The mobile device 208 may contain multiple applications in memory on the mobile device 208. In some embodiments, a single persona 220 may be instantiated per mobile device 208. Alternatively, the service provider 204 may provide a fleet of personas 220, including multiple Internet Protocol (IP) addresses, and the identity firewall 210 may include a Network Address Translation (NAT) gateway configured to route traffic to the IP addresses. In this scenario, each mobile device 208 may be assigned a particular IP address and traffic or the particular mobile device 208 may be directed to the corresponding persona 120 based at least in part on information obtained by the identity firewall 210 and information provided by the NAT gateway. For example, the identity firewall 210 may obtain information from the network traffic, such as destination IP address and port number, and determine based at least in part on the obtained information and a policy whether the network traffic authorized. The identity firewall 210 may determine various attributes of the network traffic and network devices associated with the network traffic and determine authorization and/or routing information based at least in part on the determined attributes and the policy. The policy may be provided by the customer or the service provider 204 and may define access rights to resources maintained by the personas 220, as illustrated in FIG. 2.

The service provider 204 may operate system hardware, described in greater detail below, used to execute the personas 220 and enable communication between the mobile device 208 and the persona 220. The persona 220 may execute one or more applications on behalf of the mobile device 208 including computing resources, such as data objects, storage device, or other computing resources hosted by the system hardware. Furthermore, the persona 220 may have a persistent power supply due to the system hardware that is executing the persona 220 being connected to the power grid. In some embodiments, the mobile device 208 and the persona 220 may each execute a copy of the applications and the applications may transmit data used during execution of the application between the mobile device 208 and the persona 220 through the identity firewall 210. Additionally, separate applications may communicate between each other while being executed by the personas 220. For example, a messaging application executed by the persona 220 may communicate with a photo gallery application executed by the persona 220 or another persona distinct from the persona 220.

Application executed by the persona 220 may also transmit data to one or more other personas 220. For example, the messaging application discussed above may transmit a message directly to one or more other personas 220 associated with a mobile device 208 through the identity firewall 210. The identity firewall 210 may determine attributes of the message and authorize and route the message to the appropriate persona 220 based at least in part on the determined attributes. For example, the identity firewall 210 may determine a location of the mobile device 208 and allow the message to be transmitted to the one or more other personas 220 if the mobile device 208 is in the same location as the mobile devices associated with the one or more other personas 210.

The persona 220 may enable the recipient mobile device 208 to receive the message without requiring the recipient mobile device 208 to be connected to a network. In some embodiments, an agent application, described in greater detail below, may be used to facilitate the transmission and reception of notifications between the mobile device 208 and the persona 220. For example, the persona 220 may receive a message on behalf of the mobile device 208 and transmit a notification of the received message to the mobile device 208. At some point in time later, the mobile device 208 may obtain the message from the persona 220. In some embodiments, the agent application may provide data corresponding to the state of the mobile device 208 and/or information collected by one or more sensors of the mobile device 208. For example, the agent may transmit GPS coordinates and accelerometer data to the persona 220. Additionally, the agent application or other component of the mobile device 208 may include the information in network traffic transmitted by the mobile device 208 in order to enable the identity firewall 210 to obtain information suitable for determining authorization, authentication, and routing information as described above. The persona 220 may perform a variety of operations based at least in part on the received information. For example, the persona 220 may notify another persona or other service provider that the mobile device is in a particular location.

Figure 3:
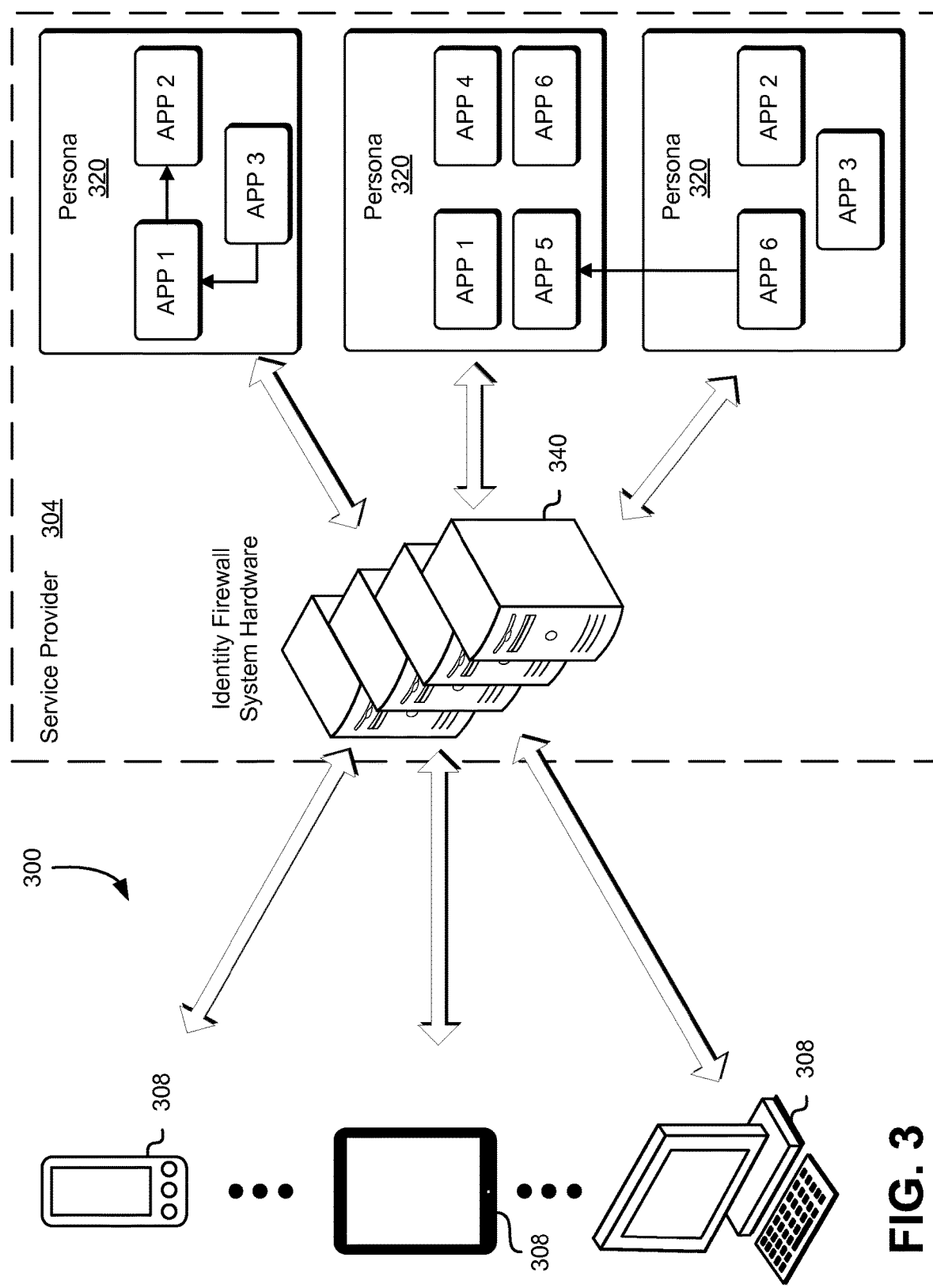
FIG. 3 is a diagram illustrating an environment including instance-backed mobile devices in accordance with at least one embodiment.

FIG. 3 illustrates an example environment 300 where one or more mobile devices 308 owned and/or associated with a single customer, as well as the associated code running thereon, may be associated with a persona 320. The persona 320 may be implemented as a virtual machine instance as illustrated in FIG. 3. A service provider 304 may provide a variety of services to the customer and the customer may communicate with the service provider 304 via an interface executed by the system hardware 340, which may be a web services interface or any other type of customer interface. For example, the system hardware 340 may include a routing fleet configured to receive network traffic, such as requests, associated with the mobile device 308 and direct the network traffic to the appropriate persona 320. The customer may be an organization that may utilize one or more of the services provided by the service provider 304 to maintain and deliver information to its employees, which may be located in various geographical locations. For example, the organization may provide employee with a mobile device to enable communication between the various geographic locations the organization operates.

Additionally, the customer may be an individual that utilizes the services of the computing resource service provider. The customer may communicate with the service provider 304, using the mobile device 308, through a network, whereby the network may be a communication network, such as the Internet, an intranet or an Internet service provider (ISP) network. Some communications from the customer to the service provider 304 may cause the service provider 304 to operate in accordance with one or more embodiments described herein or a variation thereof.

For example, the customer may, using the customer's mobile device 308, execute an application which may cause the service provider 304 to instantiate a persona 302 on behalf of the customer. As illustrated in FIG. 3, the customer may be given a single persona associated with one or more of the customer's mobile devices 308. For example, the customer may register one or more mobile devices with the service provider 308, and the registration process may associate the persona 320 with the registered mobile devices 308. The persona 320 may provide synchronization between the one or more mobile devices 308 owned by the customer. For example, the customer may modify the parental control settings for a particular application using a first mobile device 308. The persona 320 may then cause the modification of the parental control settings to be applied to one or more other mobile devices 308 registered with the customer's account. Additionally, the customer may access one or more of the customer's mobile devices 308 from another device. For example, the customer's smartphone may not have enough battery power or otherwise may have been rendered inoperable, and the customer may access the applications and other data contained on the smartphone by using another computer system connected to the persona 320.

In some embodiments, the persona 320 may execute software and other applications on behalf of the mobile device 308 and the mobile device 308 may execute a receiver application configured to connect to the persona 320 and render the state of the persona 320 on a display device connected to the mobile device 308. The persona 320 may enable communication between one or more applications executed by the persona 320 or one or more other personas as described above in connection with FIG. 1. In some embodiments, the persona 320 may be configured to alert an operator of a first mobile device of an activity of a second mobile device 308. For example, the customer may access a video streaming application on the customer's tablet and may receive a notification on the tablet from the persona 320 that the customer's smartphone is attempting to access the same or a different application. The persona 320 may enable the customer to receive notifications corresponding to the activity of the customer's mobile devices 308 and enable the customer to determine access policies of the customer's mobile devices 308. For example, the customer may allow the customer's smartphone to access all of the application executed by the persona 320 but may restrict certain application form executing on customer's tablet, which may be frequently utilized by children.

Figure 4:
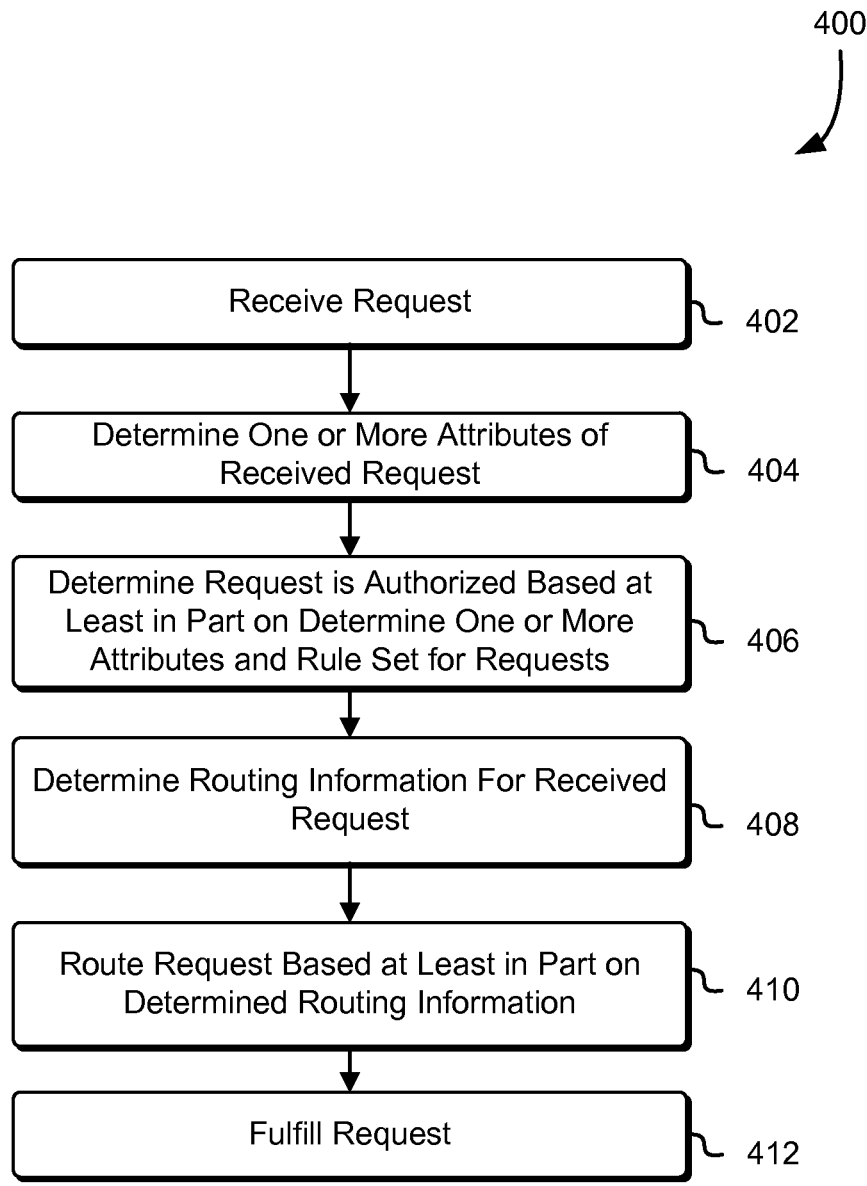
FIG. 4 is an illustrative process for performing attribute-based authorization and routing in accordance with at least one embodiment.

FIG. 4 shows an illustrative example of the process 400 which may be used to enable communication between a mobile device and a persona based at least in part on one or more attributes using an identity firewall. The process 400 may be performed by any suitable system such as the identity firewall described above in connection with FIGS. 1 and 2. Returning to FIG. 4, in an embodiment, the process 400 includes receiving a request 402. The request may include any network traffic as described above in connection with FIG. 2. For example, the request may include a request to access resources of the persona. In another example, the request may include a message directed to a mobile device associated with the persona. The request may be received at the identity firewall or at another network device and directed to the identity firewall. In various embodiments, the identity firewall may be integrated with the persona. For example, the identity firewall may be an application executed by the persona.

The identity firewall may then determine one or more attributes of the received request 404. For example, the request may include an OAuth token or electronic signature as described above. Furthermore, the electronic signature may attest to various attributes of the request. For example, the electronic signature may include a signed certificate from the mobile device or other device authenticating a particular attribute of the request or requestor, such as location of the mobile device or blood glucose level of the requestor. The identity firewall may also obtain the one or more attributes from sources other than the request. For example, the identity firewall may query a service of a computing resource service provider for information about a particular persona associated with the request, such as whether the persona is included in a friends list or other data structure authorizing the requestor to transmit requests to a particular recipient.

The identity firewall may then determine the request is authorized based at least in part on the one or more attributes and a rule set and/or policy for processing request 406. For example, the customer may define a set of policies for personas associated with the customer mobile device. The policies may indicate whether requests are to be authorized based on various attributes. For example, the customer may indicate in the policy that a requestor may obtain access to various persona resources if the requestor is a member of the same organization as the customer. In another example, the policies may indicate that a requestor may obtain images captured by the customer if the requestor is in the same location the images were captured and within a certain time period from when the images were captured.

If the identity firewall determines that the request is not authorized based at least in part on the rule set, the identity firewall may block the request and/or transmit notification to the customer or requestor that the request has been blocked. Alternatively, once the identity firewall has authorized the request, the identity firewall may determine routing information for the request 406. The identity firewall may determine routing information based at least in part on the determined one or more attributes 408. For example, if the one or more attributes indicate that the request is associated with the customer business, the request may be routed to the customer business persona. The request may then be routed to the appropriate persona based at least in part on the determined routing information 410. For example, the request may be for a particular computing resource maintained by a particular persona associated with the customer's mobile device and the request may be directed to the particular persona. The request may then be fulfilled 412 by the recipient of the request. As illustrated in FIG. 2, a request may be transmitted to a particular persona and the computing resources of the persona may be used to fulfill the request.

Figure 5:
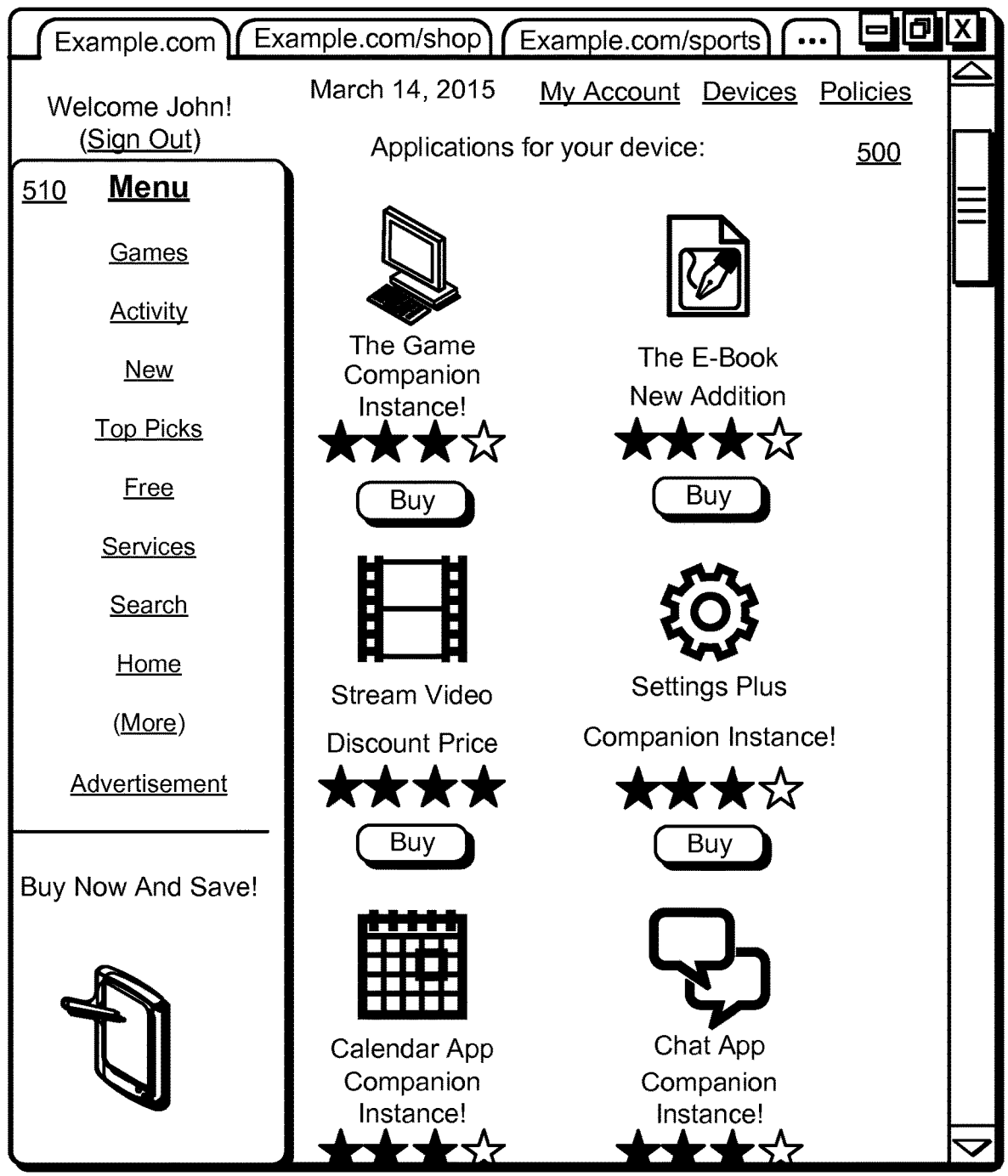
FIG. 5 is an illustrative example of a webpage for consuming instance-backed applications in accordance with at least one embodiment.

FIG. 5 shows a webpage 500, which may be displayed by an application executed by a mobile device enabling a customer to purchase or otherwise obtain one or more applications supported by a persona which may be implemented by a companion container instance and/or virtual machine instance. As illustrated in FIG. 5, the webpage 500 includes various graphical user interface elements that enable navigation throughout a mobile application store of which the webpage 500 is a part. In various embodiments, the webpage 500 is implemented by a service provider and the service provider is responsible for receiving customer input into the webpage 500 and transmitting the received input to various other services of the service provider configured to instantiate a companion container instance or companion instance associated with the application or otherwise possess the customer's input. For example, as described in greater detail below, the customer's input may cause the service provider to enable the customer's mobile device and an associated companion container instance to access an application in order to install the application on the mobile device and the companion container instance. Additionally, the customer input may include policy definitions or other information suitable for use in managing network traffic by the identity firewall as described above.

The webpage 500 may be displayed by various applications, such as a mobile application or web browser. In this example, the webpage 500 includes various navigational features. For instance, on the left-hand side of the webpage 500, various links 510 may link to one or more other webpages that contain additional content corresponding to the application store. In this example, the links appear as textual words, which enable the links to be selected using an appropriate input device such as a keyboard, mouse, touchscreen or other input device. Selection of one of the links 510 may cause an application displaying the webpage 500 to submit, pursuant to a uniform resource locator (URL) associated with the selected link by the programming of the webpage 500, an HTTP request for the content associated with the link to a server that provided the webpage 500 or another server. In this example, the webpage 500 also includes a graphical user element configured as a "buy" button. The buy button may be a graphical user interface element of the webpage 500 where the underlying code of the webpage 500 is configured such that selection by an input device of the buy button causes information corresponding to the selection to be transmitted to one or more servers of the service provider.

The webpage 500 may also include a description of the applications and/or other information associated with the applications displayed in webpage 500. The description may provide information to the customer including whether the application is associated with a companion container instance or companion instance. In some embodiments, the mobile device may be provided with a persona when an application or particular application is consumed from the application store. For example, a persona may be instantiated and associated with the customer mobile device once the customer has downloaded and/or installed an application of the customer's mobile device that is supported by a persona. In this example, the webpage 500 contains six applications that the customer may download and/or provide to the customer's mobile device. The applications may be provided by a developer, by the service provider, or any other party capable of posting an application to the webpage 500. The executable code of the application may indicate whether the application utilizes a persona.

Furthermore, the applications displayed in the webpage 500 may correspond to services offered by the service provider or one or more other organizations. For example, the services may include a messaging, delivery service, or other service. The applications displayed on the webpage 500 may contain a presentation of the application such as a graphical representation of the service or operation associated with the application, which could be text and/or a drawing, photograph, description, identification number, trademark, video clip, audio clip, or any other representation capable of representing the items. Other variations of the user interface displayed in FIG. 5 may be used in accordance with the present disclosure. For example, drop-down menus may be included in the user interface to enable the user to select a particular user account or information associated with a customer account to include when provisioning new mobile devices.

Figure 6:
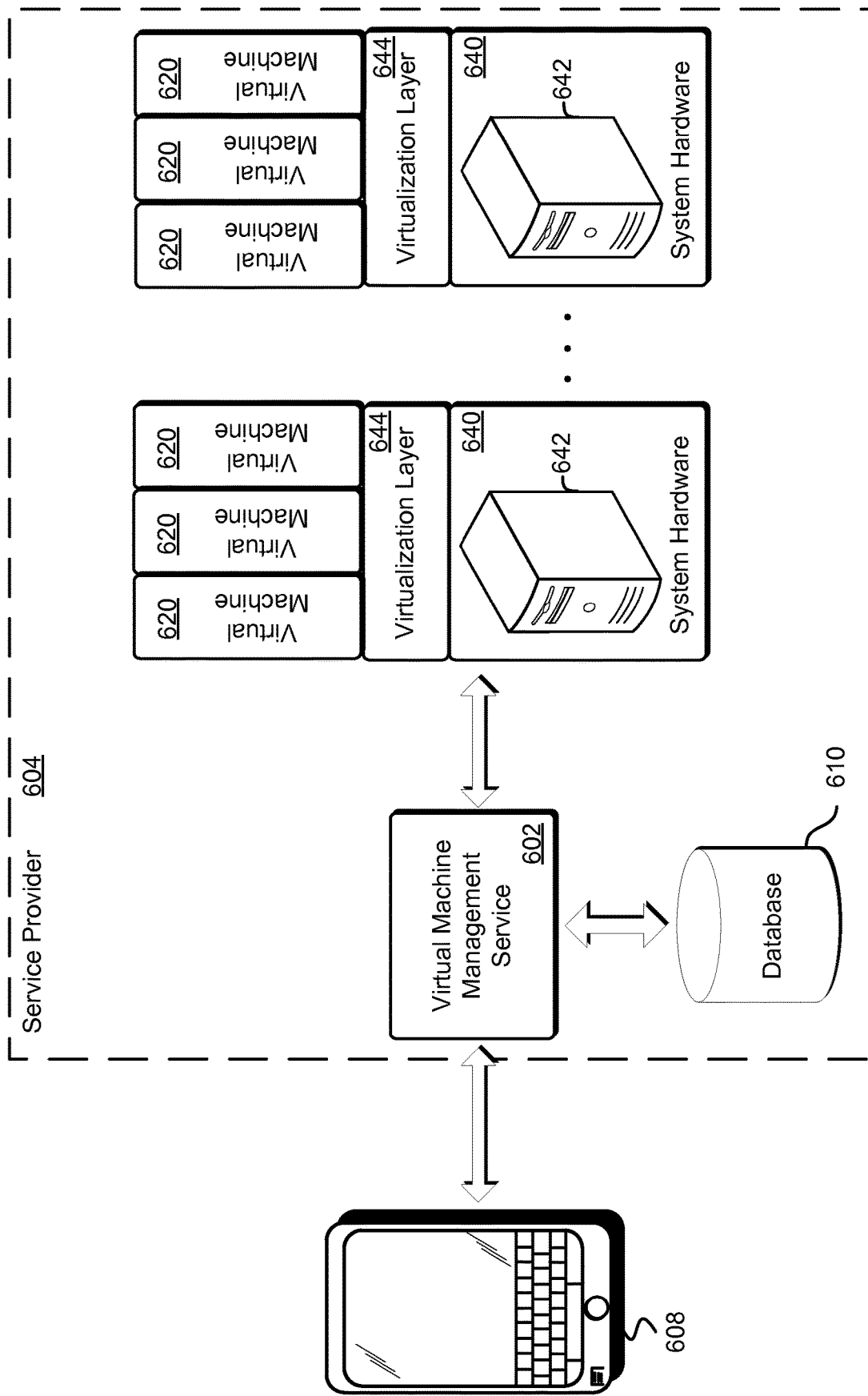
FIG. 6 is a diagram illustrating an environment for distributing applications to instance-backed mobile devices in accordance with at least one embodiment.

FIG. 6 illustrates an environment 600 in which a virtual computer system service providing personas for mobile devices in accordance with at least one embodiment. The virtual computer system service, which may be system hardware 640, is used by a service provider 604 to provide computational and other resources for mobile devices. The system hardware 640 may include physical hosts 642. The physical hosts 642 may be any device or equipment configured to execute instructions for performing data computation, manipulation or storage tasks, such as a computer or a server. A physical host 642 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The system hardware 640 may also include storage devices, such as storage disks and tapes, networking equipment and the like.

A virtualization layer 644 executing on the physical host 642 enables the system hardware 640 to be used to provide computational resources upon which one or more personas 620 may operate. For example, the virtualization layer 644 may enable a persona 620 to access system hardware 640 on the physical host 642 through virtual device drivers on the virtual machine 620. Furthermore, physical host 642 may host multiple personas 620 of the same or different types on the same system hardware 640. The personas 620 may be any device, software or firmware used for providing a computing platform for the mobile device 608. For example, the persona may, in some embodiments, be implemented as a physical computer system configured to perform operations on behalf of the mobile device 608. Furthermore, the persona 620 may be generated and/or instantiated as a result of the mobile device 608 completing a boot operation.

The virtual computing platform may include various virtual computer components, such as one or more virtual CPUs, virtual memory and the like. The personas 620 may be provided to the customers of the service provider 604 and the customers may run an operating system or an application on the virtual machines 620 in support of the mobile device 608. Further, the service provider 604 may use one or more of its own virtual machines 620 for executing its applications, such as the application management service described above.

In some embodiments, the mobile device 608 may communicate with the corresponding persona through the virtual machine management service 602. For example, the mobile device may transmit commands and other information to the virtual machine management service and the commands may indicate operations to be performed by the persona. The commands and other information may be included in an API call from the virtual machine management service 602 to the persona 620. The virtual machine management service 602 may enable the mobile device 608 to manage and operate the personas 620.

For example, the mobile device 608 may transmit a request to the virtual machine management service 602 to have the persona 620 process an image. The request may be an API call including information corresponding to the image and the personas 620. The virtual machine management service 602 may determine the corresponding physical host 642 for the personas 620 included in the request and transmit the image and/or request to the persona. The virtual machine management service 602 may maintain a database 610 with one or more records containing information corresponding to the personas 620. For example, the database 610 may contain a Domain Name System (DNS) entry indicating an IP address useable for communicating with a particular persona. Returning to the example above, the virtual machine management service 602 may receive a request, from the mobile device, to interact with the corresponding persona 620. The virtual machine management service 602 may locate the persona 620 in the database 610 and transmit the request to the persona 620.

In another example, the request from the mobile device may include a request to instantiate a persona 620. The virtual machine management service 602 may then determine a physical host 642 capable of executing the persona 620 on system hardware 640. The virtual machine management service 602 may then send the command to instantiate the persona 620 to virtualization layer 644 on the determined physical host 642. The virtualization layer 644 may then instantiate the persona 620. The virtualization layer 644 may then return information corresponding to the persona 620 to the virtual machine management service 602 and the virtual machine management service 602 may record at least a portion of the information in the database 610. For example, the virtualization layer 644 may return location information corresponding to the persona 620 which may then be stored in a record in the database associated with the mobile device 608.

Figure 7:
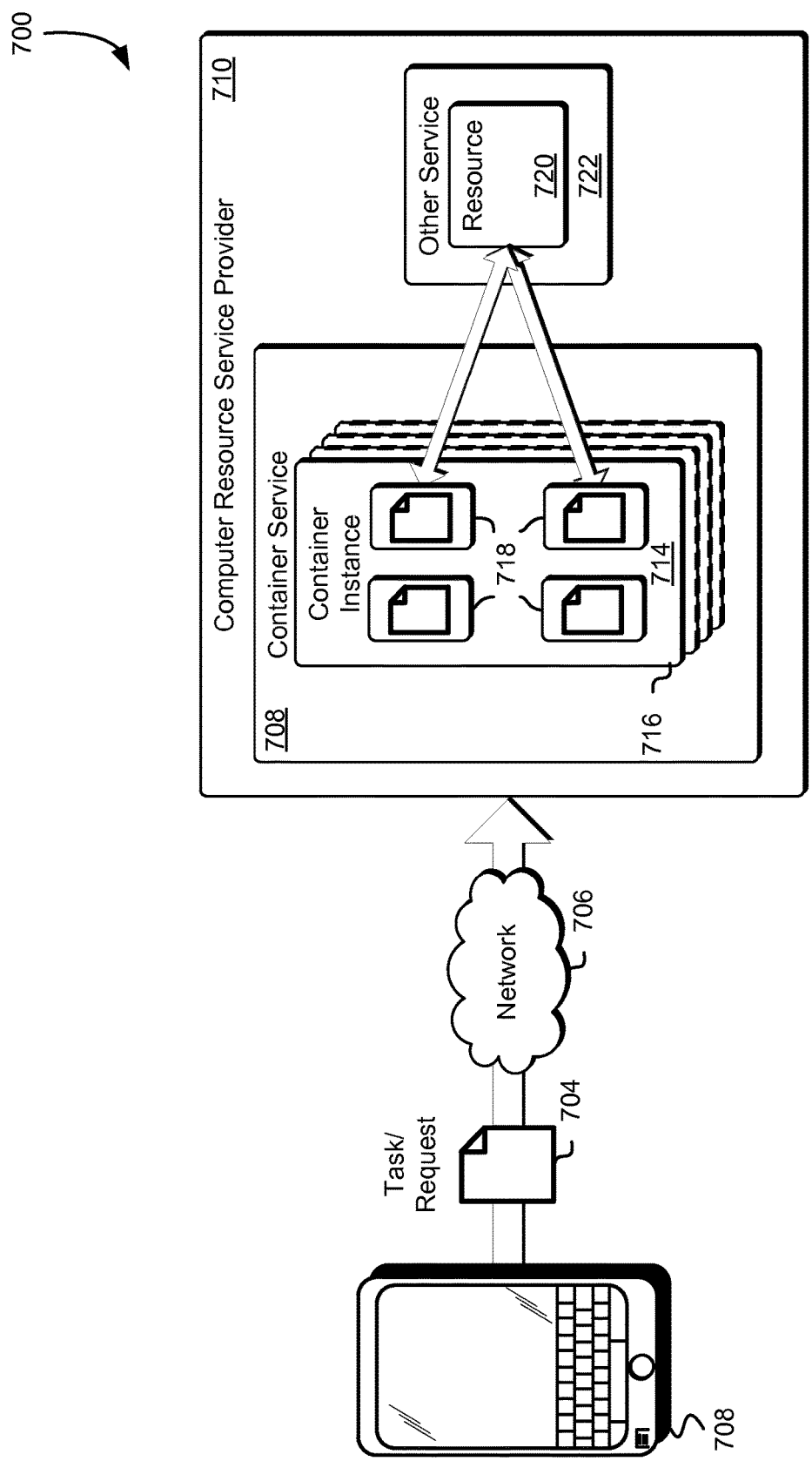
FIG. 7 illustrates an example of a customer's mobile device interacting with a container service in accordance with an embodiment.

FIG. 7 illustrates an aspect of an environment 700 in which an embodiment may be practiced. As illustrated in FIG. 7, the environment 700 may include a customer's mobile device 708 that sends a task definition file 704 for software containers 718 along with a request to launch tasks through a network 706 to a container service 712 of a computing resource service provider 710. A scheduler, such as the scheduler described in greater detail below in connection with FIG. 7, may determine into which container instance 714 of a cluster 716 of container instances that the software containers 718 specified in the task definition file 704 should be launched. In some embodiments, the software containers may be configured to share resources 720 provided by other services 722 of the computing resource service provider 710, such as a storage volume provided by a block-level data storage service of the computing resource service provider 710.

The mobile device 708 may be any suitable computer system, mobile phone, smartphone, tablet, portable computer or combination thereof capable of communicating with the container service 712 through a service provider 710 The mobile device 708 may contain multiple applications, task 704, and software containers in memory. In some embodiments, a single companion container instance 714 may be instantiated per mobile device 708. Alternatively, the service provider 710 may provide a fleet or cluster of companion container instances 716 including multiple Internet Protocol (IP) addresses and a Network address translation (NAT) gateway configured to route traffic to the IP addresses. In this scenario, each mobile device 708 may be assigned a particular IP address and traffic for the particular mobile device 708 or may be directed to the corresponding companion container instance 714 of the cluster 716, based at least in part on information provided by the NAT gateway. In various embodiments, the container service 712 or other service 720 may contain the task and/or software container to be executed by the container instance 714 on behalf of the mobile device 708. In such embodiments, the mobile device 708 may transmit a request to the computing resource service provider to execute one or more tasks and/or software containers indicated in the request.

Furthermore, the resources of the mobile device 708 may be made available to other users and/or devices. For example, the mobile device 708 may utilize the container instance 714 to provide a virtual presence for other users, and these other users may then interact with the mobile device 708 through the virtual presence provided by the container service 712. The mobile device 708 may communicate with the container service 712 of the computing resource service provider 710 through the network 706, which may be a communication network, such as the Internet, an intranet, an internet service provider (ISP) network and/or some other such network as described below.

In some examples, a "task definition" or "task definition file" may refer to a file specifying a set of linked containers (i.e., a set of containers that, when running on a host computing system, are associated with each other) that are assigned to start as a group. The task definition file 704 may further specify disk and network locations that the software containers 718 are able to share on a single physical machine. The task definition file 704 may then be utilized for launching the set of containers 718. In some implementations, the task definition file 704 may define and linked software containers 718 spread across multiple physical machines. One task definition file 704 may contain and schedule many tasks. In some examples, a "task" may refer to an instantiation of a task definition file 704, and may consist of one or more software containers 718. Tasks may be modified by applying a new task definition to the task.

The task definition file 704 may contain all the information needed to place software containers 718 in containers 714 of a cluster 716, and the cluster 716 may be managed through application programming interface calls.

An example of a task definition may be:
{'db':
  {
    'Image': 'forest/postgresql',
    'Ports': ['5432'],
    'CPU': 1000,
    'Memory': 1073741824
  },
  'web':
  {
    'Image': 'hub.web.com/rails:latest',
    'Ports': ['8000:8000'],
    'links': ['db'],
    'CPU': 1000,
    'Memory': 1073741824
  }
}

The example task definition specifies that a first task, entitled "db," has a software image located at the path "forest/postgresql." The first task is allocated processing capacity of 1,000 and 1 gigabyte of memory, and the first task uses port 5432. Similarly, the task definition also specifies that a second task, entitled "web," has a software image located at the path "hub.web.com/rails:latest." The second task is allocated processing capacity of 1,000 and 1 gigabyte of memory, and the second task uses ports 8000:8000. The task definition notes that the second task ("web") is allowed to link to the first task ("db").

The container service 712, described in greater detail below in connection with FIG. 2, may be a service provided by the computing resource service provider 710 to allow the mobile device 708 to execute the containers 718 within the cluster 716. The computing resource service provider 710, described in greater detail below, may provide one or more computing resource services to its customers individually or as a combination of services of a distributed computer system. The one or more computing resource services of the computing resource service provider 710 may be accessible over the network 706 and may include services such as virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

The mobile devices 708 supported by the container service 712 of the computing resource service provider 710 may communicate with one or more of the services, including the container service, via an interface, which may be a web services interface or any other type of customer interface. Each service provided by a computing resource service provider may have its own interface and subsets of the services may have corresponding individual interfaces in addition to, or as an alternative to, a common interface.

In some examples, a "container instance" may refer to a computer system instance (virtual or non-virtual, such as a physical computer system running an operating system) that is configured to launch and run software containers 718. Thus, the container instance 714 may be configured to run the software containers 718 within the container instance 714 in accordance with the task definition file 704 provided by the mobile device 708 or other entity, such as a software developer, described above. One or more container instances 714 may comprise a cluster 716. In some examples, "cluster" may refer to a set of one or more container instances 714 that have been registered with the cluster, described in greater detail below in connection with FIG. 2. Thus, the container instance 714 may be one of many different container instances 714 registered with the cluster 716, and the other container instances of the cluster 716 may be configured to run the same or different types of software containers 718 as the container instance 714. The container instances 714 within the cluster 716 may be of different instance types or of the same instance type, and the mobile device 708 may have access to or interact with more than one cluster 716. Thus, the mobile device 708 may launch one or more clusters 716 and then manage user and application isolation of the software containers 718 within each cluster 716 through application programming interface calls.

A software container 718 may be a lightweight virtualization instance running under a computer system instance that allows processes and data used by the processes within the software container 718 to be isolated from other processes running in the same computer system instance or container instance 714. Thus, the software containers 718 may each be virtualization instances running under an operating system of the container instance 714 and executing in isolation from each other. Each of the software containers 718 may have their own namespace, and applications running within the software containers 718 are isolated by only having access to resources available within the container namespace. Thus, software containers 718 may be an effective way to run one or more single applications within their own namespace. A container encapsulation system allows one or more software containers 718 to run within a single operating instance without overhead associated with starting and maintaining virtual machines for running separate user space instances. An example container encapsulation system is the Docker container engine.

The software containers 718 may be launched to have only specified resources from resources allocated to the container instance 714; that is, a software container 718 may be launched to have a certain amount of memory and to not utilize more than a specified amount of processing power. The resource allocation for the software containers 718 may be specified in the task definition file 704. Multiple software containers 718 may be running simultaneously on a single host computer or host container instance, and the resources of the host can be allocated efficiently between the software containers 718, container instances 714, and/or clusters 716 of container instances 714. In some embodiments, a host may support running software containers 718 in container instances 714 from only one mobile device 708. In other embodiments, a single host may allow multiple mobile devices 708 to have container instances 714 running on the host. In the latter case, the container service 710 may provide security to ensure that the mobile devices 708 are unable to access containers, clusters, or container instances of the others.

Different types of tasks may have different resource requirements and may have different lifespans. Thus, the software containers 718 may be dynamically scheduled to run by a scheduler service in the container service 710 independent of an underlying operating system of the container instance 714, and as such, the underlying operating system of the container instance 714 may be very basic. Alternatively, the containers 718 may be scheduled to run by a scheduler installed within the container instance 714 of the cluster 716.

The other services 722 may be services such as services described above of the computing resource service provider described in greater detail below. Likewise, the other resources 720 may include resources that can be shared between virtualized instances, such as a storage volume of a block-level data storage service.

Figure 8:
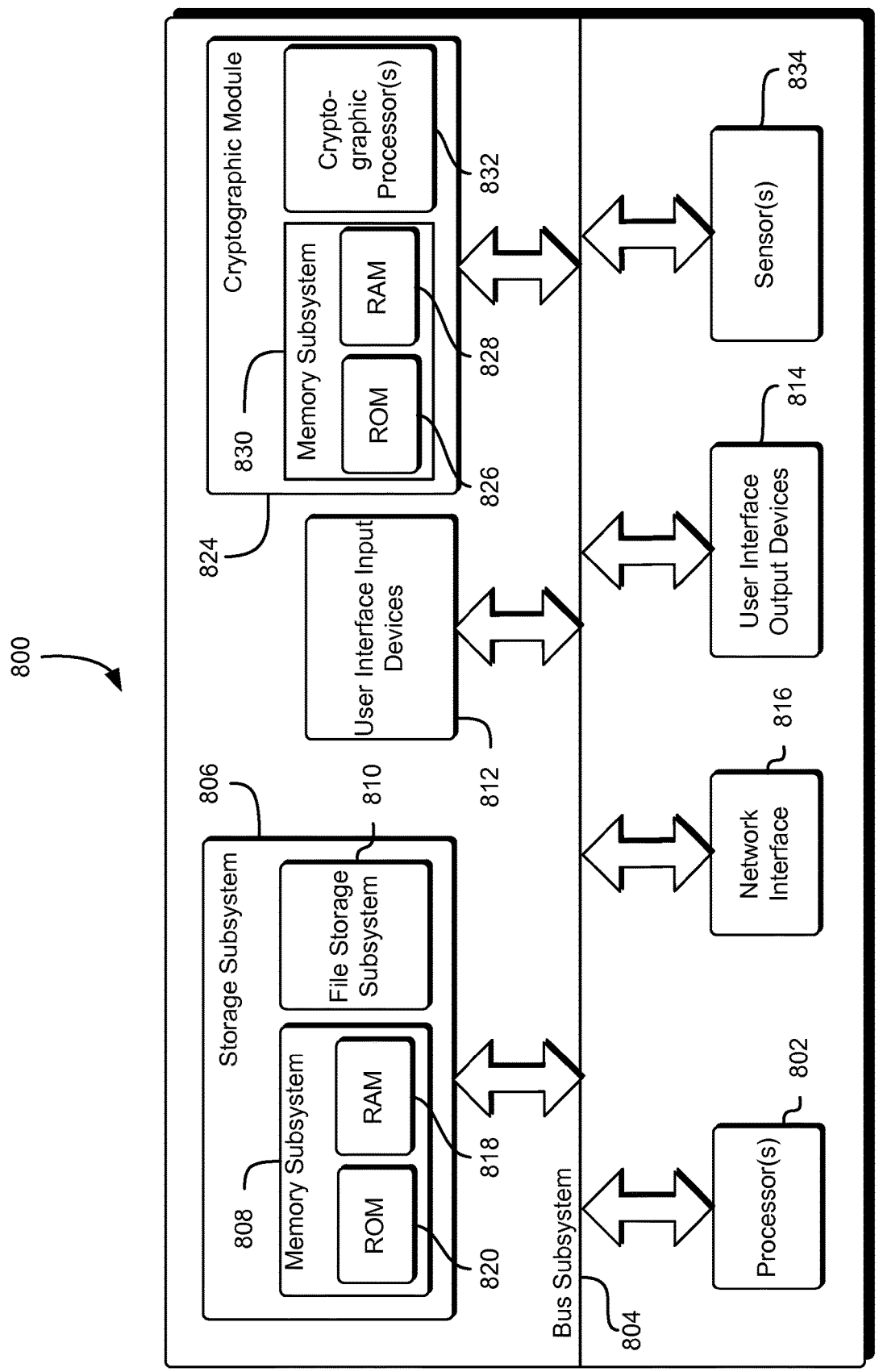
FIG. 8 shows an illustrative example of components of a computing device in accordance with at least one embodiment.

FIG. 8 is an illustrative, simplified block diagram of an example mobile device 800 that may be used to practice at least one embodiment of the present disclosure. In various embodiments, the device system 800 may be used to implement any of the systems illustrated herein and described above. For example, the device system 800 may be used to implement a mobile device and other applications, such as a browser application, in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface input devices 812, one or more user interface output devices 814, a network interface subsystem 816, a cryptographic module 824, comprising a memory subsystem 830, and one or more cryptographic processors 832. The peripheral subsystems may also include one or more sensors 834 in addition to sensors of input devices 812. Such sensors may include, but are not limited to, GPS sensors, accelerometers, temperature sensors and others.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the device system 800. For example, the network interface subsystem 816 may enable transmission of application data and other information, such as electronic requests to access a system (e.g., receive a webpage) and may enable receipt of responses to the requests, such as webpages or other information. The network interface subsystem 816 may also facilitate the receipt and/or transmission of data on other networks, such as an organization's intranet and/or other networks described below.

The user interface input devices 812 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 800.

User interface output devices 814, if any, may include a display subsystem, or non-visual displays, such as audio and/or tactile output devices, etc. Generally, the output devices 814 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure and may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 824 may be configured to collectively perform various operations used generating cryptographically verifiable information for authentication objects.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF, and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 9:
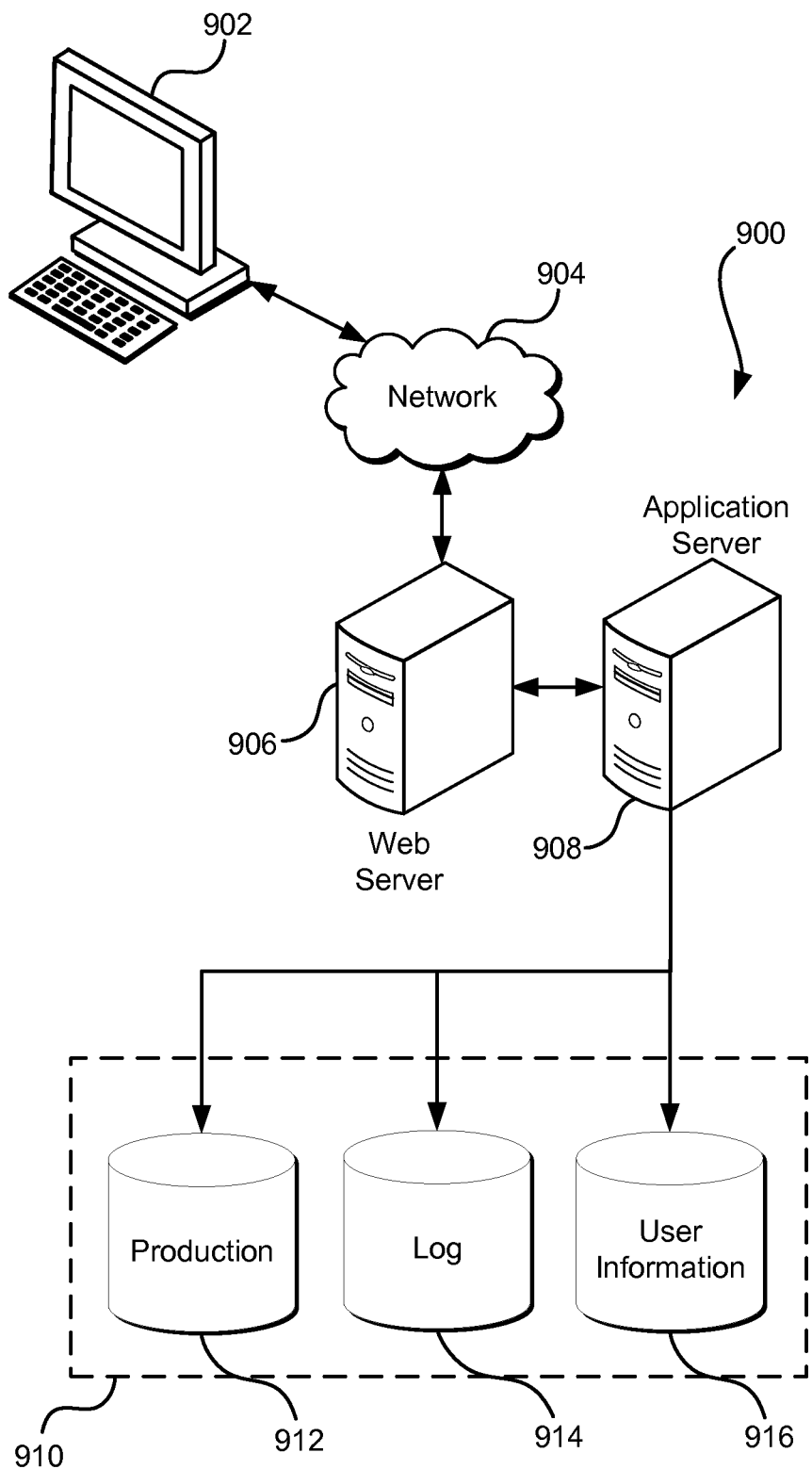
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle °, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a firewall associated with a first device, a request directed to the first device from a second device;
   determining that the first device is associated with a companion instance that performs operations on behalf of the first device;
   determining one or more attributes associated with the request, the one or more attributes indicating an identity associated with the second device, the request including a digital signature that attests to the one or more attributes;
   determining, based at least in part on the one or more attributes and a rule set indicating a policy for accessing resources of the companion instance associated with the first device, a particular resource from a set of possible resources to provide in response to the request, the rule set indicating whether the particular resource is accessible to the second device associated with the identity;
   determining routing information corresponding to the companion instance and the particular resource based at least in part on the one or more attributes; and
   providing the request to the companion instance based at least in part on the determined routing information such that the companion instance can provide the particular resource to the second device in response to the request.

2. The computer-implemented method of claim 1, wherein the one or more attributes associated with the request further includes attributes of the requestor responsible for providing the request.

3. The computer-implemented method of claim 1, wherein the one or more attributes associated with the request further includes a token generated by a third party.

4. The computer-implemented method of claim 1, wherein the one or more attributes associated with the request further includes a time associated with the request and a geographic location of where the request was submitted.

5. A system, comprising:
   one or more processors; and
   memory with instructions that, if executed by the one or more processors, cause the system to:
      obtain, at a firewall associated with a first device, a request to access one or more resources of the first device, where the one or more resources are maintained by one or more companion instances associated with the first device and the request is directed to the first device from a second device, the firewall managing network traffic access to the first device;
      select, from the one or more resources of the first device, a particular resource to provide in response to the request based at least in part on one or more attributes of the obtained request, the one or more attributes of the obtained request including a digital signature of a configuration of computer system responsible for submitting the request;
      determine a particular companion instances of the one or more companion instances to process the request based at least in part on the one or more attributes and the particular resource, where the one or more attributes indicate an identity associated with the second device and a rule set indicates the particular companion instance based at least in part on the identity; and
      provide, to the determined particular companion instance, the obtained request to the one or more companion instances such that the one or more companion instances fulfills the request.

6. The system of claim 5, wherein selecting, from the one or more resources of the first device, the particular resource to provide in response to the request further comprises selecting an image based at least in part on the one or more attributes of the received request and a policy set associated with the one or more resources.

7. The system of claim 5, wherein the instructions that cause the system to authorize the request based at least in part on one or more attributes of the obtained request further include instructions that, if executed by the one or more processors, cause the system to obtain at least one attribute of the one or more attributes of the obtained request from a third party.

8. The system of claim 5, wherein the memory further includes instructions that, if executed by the one or more processors, cause the system to obtain a policy set that defines access to the one or more resources of the first device.

9. The system of claim 8, wherein the instructions that cause the system to obtain the policy set further include instructions that, if executed by the one or more processors, cause the system to obtain the policy set from a customer associated with the first device through a management console exposed to the customer.

10. The system of claim 5, wherein the request includes an attestation of the integrity of the one or more attributes.

11. The system of claim 5, wherein the memory further includes instructions that, if executed by the one or more processors, cause the system to determine a particular companion instance of the one or more companion instances to provide the request based at least in part on the particular resource being maintained by the particular companion instance.

12. The system of claim 5, wherein the request is obtained from a device connected to a network including the first device.

13. A non-transitory computer-readable storage medium storing thereon executable instructions that, if executed by one or more processors of a first computer system associated with a second computer system to manage network traffic directed to the second computer system, cause the first computer system to:

determine at least one attribute of a obtained request directed to the second computer system from a third computer system to access a set of resources associated with the second computer system, where at least a portion of the set of resources are maintained by a companion computer system, the request including a cryptographic attestation of the integrity of the one or more attributes;

determine a particular resource of the portion of the set of resources to provide in response to the obtained request based at least in part on the determined at least one attribute and a rule set associated with the second computer system, where the least one attribute indicates an identity associated with the third computer system and the rule set indicates the particular resource is accessible to the identity;

determine that the companion computer system associated with the second computer system maintains the particular resource; and allow access to the particular resource, through the companion computer system, based at least in part on the determined at least one attribute and a rule set associated with the second computer system.

14. The non-transitory computer-readable storage medium of claim 13, wherein the instructions that cause the first computer system to determine the at least one attribute of the obtained request further include instructions that cause the first computer system to determine that the at least one attribute is common to a requestor associated with the obtained request and a customer associated with the second computer system.

15. The non-transitory computer-readable storage medium of claim 13, wherein the rule set defines access privileges to the portion of the set of resources maintained by the companion computer system.

16. The non-transitory computer-readable storage medium of claim 13, wherein the instructions that cause the first computer system to allow access to the particular resource further include instructions that cause the first computer system to transmit the particular resource to a requestor associated with the obtained request based at least in part on a set of possible resources of the portion of the set of resources suitable for responding to the request and the rule set.

17. The non-transitory computer-readable storage medium of claim 13, wherein the instructions that cause the first computer system to allow access to the particular resource further include instructions that cause the first computer system to allow access to the particular resource based at least in part on information corresponding to the requestor associated with the third computer system being included in the obtained request.

18. The non-transitory computer-readable storage medium of claim 13, wherein the instructions further comprise instructions that, if executed by the one or more processors, cause the first computer system to authenticate the received obtained request based at least in part on the at least one attribute of the obtained request.

19. The non-transitory computer-readable storage medium of claim 13, wherein the instructions that cause the first computer system to allow access to the particular resource further include instructions that cause the first computer system to fulfill the obtained request using the particular resource.

20. The non-transitory computer-readable storage medium of claim 13, wherein the instructions that cause the first computer system to allow access to the particular resource further include instructions that cause the first computer system to transmit the obtained request to the companion computer system based at least in part an amount of load on the companion computer system.

21. The non-transitory computer-readable storage medium of claim 13, wherein the companion instance is an instance of a virtual computer system.

* * * * *